(12) United States Patent
Fawcett et al.

(10) Patent No.: US 12,138,833 B2
(45) Date of Patent: Nov. 12, 2024

(54) METHOD OF MANUFACTURING A STRAP FOR A WEARABLE DEVICE

(71) Applicant: ARMOUR SURVEILLANCE SECURITY EQUIPMENT AND TECHNOLOGY LTD, London (GB)

(72) Inventors: Patrick James Fawcett, London (GB); Richard Dinan, London (GB)

(73) Assignee: Armour Surveillance Security Equipment and Technology LTD, London (GB)

(*) Notice: Subject to any disclaimer, the term of this patent is extended or adjusted under 35 U.S.C. 154(b) by 0 days.

(21) Appl. No.: 18/389,643

(22) Filed: Dec. 19, 2023

(65) Prior Publication Data

US 2024/0206606 A1 Jun. 27, 2024

(30) Foreign Application Priority Data

Dec. 22, 2022 (GB) .................................... 2219482
Feb. 17, 2023 (GB) .................................... 2302318

(51) Int. Cl.
*B29C 45/14* (2006.01)
*A44C 27/00* (2006.01)
(Continued)

(52) U.S. Cl.
CPC ........ *B29C 45/14065* (2013.01); *A44C 27/00* (2013.01); *B29C 45/2711* (2013.01);
(Continued)

(58) Field of Classification Search
CPC .... B29C 45/14065; B29C 2045/14098; B29C 2045/14122; B29C 2045/14131; B29C 2045/14139; B29C 2045/14147
See application file for complete search history.

(56) References Cited

U.S. PATENT DOCUMENTS 3,081,497 A * 3/1963 Scherry ............. B29C 45/14639
264/277
3,109,201 A * 11/1963 Dulmage .......... B29C 45/14065
249/105
(Continued)

FOREIGN PATENT DOCUMENTS

CN 113974279 A 1/2022
DE 1806449 A1 6/1969
(Continued)

OTHER PUBLICATIONS

Search Report under Section 17, issued in GB 2302318.7 (Jul. 31, 2023).
(Continued)

*Primary Examiner* — Timothy Kennedy
(74) *Attorney, Agent, or Firm* — Merchant & Gould P.C.

(57) ABSTRACT

A method of manufacturing a wearable device comprising a printed circuit board (PCB) on which is mounted electronic components, the method includes providing a mould attaching the PCB to a cage, the cage comprising a cage body and at least one hole, inserting said PCB into the mould; arresting the PCB relative to the mould by inserting an insert tool into the mould and attaching the insert tool to said at least one hole, injecting a wet applied structural component into said mould and removing said mould.

14 Claims, 7 Drawing Sheets

(51) Int. Cl.
  B29C 45/27 (2006.01)
  G04D 3/00 (2006.01)
  G04G 17/04 (2006.01)
  B29C 45/00 (2006.01)

(52) U.S. Cl.
  CPC .......... G04D 3/0002 (2013.01); G04G 17/04 (2013.01); B29C 2045/0027 (2013.01)

(56) References Cited

U.S. PATENT DOCUMENTS

| | | | | |
|---|---|---|---|---|
| 3,962,399 | A * | 6/1976 | Shepherd, Jr. | B25D 1/045 |
| | | | | 264/261 |
| 4,368,028 | A * | 1/1983 | Grish | B29C 45/36 |
| | | | | 425/569 |
| 4,470,786 | A * | 9/1984 | Sano | B29C 45/14073 |
| | | | | 425/149 |
| 5,135,694 | A | 8/1992 | Akahane | |
| 5,526,006 | A | 6/1996 | Akahane et al. | |
| 6,030,197 | A * | 2/2000 | Takahashi | B29C 45/14065 |
| | | | | 425/577 |
| 6,401,307 | B1 | 6/2002 | Wild | |
| 9,904,320 | B2 | 2/2018 | Justice | |
| 11,077,589 | B2 | 8/2021 | Tanabe | |
| 11,128,325 | B2 | 9/2021 | Dinan | |
| 2006/0140055 | A1 | 6/2006 | Ehrsam | |
| 2007/0279852 | A1 | 12/2007 | Daniel | |
| 2009/0222130 | A1 | 9/2009 | Morse | |
| 2015/0063075 | A1 | 3/2015 | Baek et al. | |
| 2015/0092360 | A1 * | 4/2015 | Stillman | H05K 1/181 |
| | | | | 361/749 |
| 2015/0346766 | A1 | 12/2015 | Justice | |
| 2015/0378391 | A1 | 12/2015 | Huitema | |
| 2016/0014919 | A1 | 1/2016 | Huitema et al. | |
| 2017/0357214 | A1 | 12/2017 | Choi et al. | |
| 2019/0036556 | A1 | 1/2019 | Dinan et al. | |
| 2019/0304265 | A1 | 10/2019 | Guercio | |
| 2021/0036728 | A1 | 2/2021 | Dinan | |
| 2022/0035317 | A1 | 2/2022 | Porter et al. | |

FOREIGN PATENT DOCUMENTS

| | | |
|---|---|---|
| DE | 3302789 A1 | 8/1983 |
| GB | 2616966 A | 9/2023 |
| KR | 20160048696 A1 | 5/2016 |
| KR | 1020160048696 A | 5/2016 |
| KR | 1020160048696 A1 | 5/2016 |
| WO | 2017/136383 A1 | 8/2017 |

OTHER PUBLICATIONS

Search Report under Section 17, issued in GB 2302889.7 (Aug. 9, 2023).
Search Report under Section 17, issued in GB 2302890.5 (Aug. 11, 2023).
Combined Search and Examination Report under Section 17 and 18(3), issued in GB 2305015.6 (Aug. 29, 2023).
Combined Search and Examination Report under Section 17 and 18(3), issued in GB 2302301.3 (Jul. 31, 2023).
UK Examination Report received for UK Application No. GB2305015.6 on May 31, 2024, 5 pgs.
UK Examination Report received for UK Application No. GB2302301.3 on Jun. 3, 2024, 4 pgs.
Extended European Search Report received for EP Application No. 23215668.7 on May 22, 2024, 6 pgs.
Extended European Search Report received for EP Application No. 23215663.8 on May 22, 2024, 11 pgs.
Extended European Search Report received for EP Application No. 23215675.2 on May 22, 2024, 9 pgs.
Extended European Search Report received for EP Application No. 23215672.9 on May 22, 2024, 9 pgs.

* cited by examiner

METHOD OF MANUFACTURING A STRAP FOR A WEARABLE DEVICE

This application claims benefit of priority to British Patent Application No. 2219482.3, filed Dec. 22, 2022, and British Patent Application No. 2302318.7, filed Feb. 17, 2023, which applications are incorporated herein by reference. To the extent appropriate, a claim of priority is made to each of the above disclosed applications.

TECHNICAL FIELD

The invention relates to a method of manufacturing a strap for a wearable device.

BACKGROUND

Portable electronic devices, such as watches and straps with a radio transmitter, require a substantial number of components to be located into a relatively small volume, particularly if the resulting electronic device is to be small enough to be worn on the wrist for everyday use. There are many design limitations for such straps, such as requiring the use of radio transparent materials, being soft enough for comfort, being flexible enough to be accommodated on the wrist, whilst being sturdy enough to protect the delicate electronic components.

A common issue with such watches and straps is that the internal components can be seen deforming and protruding from the strap, such as when the strap is bent. This can cause discomfort for the user and ruin the aesthetic appeal of the strap, as well as destroying any environmental seal provided by the strap. Making the strap out of harder materials could overcome this issue but this necessarily makes the strap less comfortable and decreases flexibility.

BRIEF SUMMARY

A first aspect of the present invention relates to a method of manufacturing a wearable device comprising a printed circuit board (PCB) on which is mounted electronic components, the method comprising: providing a mould for a strap; attaching said PCB to a cage, the cage comprising a cage body and at least one hole for a fixing means; inserting said PCB into the mould; arresting the PCB relative to the mould by inserting an insert tool into the mould and attaching the insert tool to said at least one hole in said cage, injecting a wet applied structural component into said mould; removing said mould.

The present method provides a compact electronic wearable device which simultaneously protectively encapsulates the electronics and creates a blemish free outer surface. The protection prevents damage from shock and water ingress. As the device is wearable, it must be sufficiently flexible to be fitted to the user, and to be comfortable to wear.

The present invention provides a method of manufacturing a strap which includes a plurality of electronic components. By housing the electronics in the flexible portion of the strap, the upper portion is free for other purposes. This does not exclusively apply to wrists, it could be other parts of the body such as ankles.

When the volume of electronics to be housed consumes much of length of the strap, then it is not possible to have a method of adjusting strap length (such as a buckle) to cater for different wrist sizes. That scenario would require multiple strap sizes to be created to cater for all wrist sizes. The method described in this invention also caters for this scenario, with methods for holding the PCB that can be adapted to multiple different sizes. By providing a cage and insert tool which arrest the PCB during manufacture, the possibility of blemishes caused by mispositioning the PCB in the mould is removed. The cage is therefore multipurpose, it is used in manufacture of the wearable device, to position the PCB and to provide additional protection to the relatively fragile electronic components. The use of a cage to position the components means that they are ideally positioned in the mould to be fully and invisibly encapsulated by the wet applied structural component.

The method includes making the PCB suit the shape of the resulting strap as closely as possible, such that the strap is no thicker than necessary (preferably less than 9 mm thick).

Preferably, the insert tool comprises an injection portion for injecting said wet applied structural component.

Preferably, said insert tool comprises vents for drawing said wet applied structural component under vacuum.

By providing the injection portion within the insert tool, a single opening in the mould can be used to both arrest the PCB within the mould and to inject the wet applied structural component.

Preferably, the wet applied structural component comprises polyurethane.

Preferably, the mould is formed of silicone rubber, advantageously, polyurethane does not stick to silicone so the mould can be easily removed from the formed strap after the polyurethane has cured.

Preferably, prior to injecting the wet applied structural component, a space of at least 0.5 millimetres is left between the mould and the PCB in all directions. This ensures that the PCB may not rupture through the wet applied structural component and is adequately embedded within the structural component.

Preferably, the cage snap fits to the PCB.

Preferably, the electronic components include at least one of a battery, transmitter for transmitting radio signals, light emitting diode, a button for operation of another electronic component.

Preferably, the cage comprises a plurality of cages, including a first cage arresting a first electronic component, and a second cage arresting a second electronic component.

Preferably, the cage further comprises at least one cage extension, wherein said cage body arrests a first electronic component and the cage extension arrests a second electronic component.

Preferably, a first insert tool is attached to the first cage and a second insert tool attached to the second cage.

Preferably, the mould is formed of silicone.

Preferably, the mould comprises at least one vent which connects to a vacuum generator for generating a vacuum which is filled by said wet applied structural component.

Preferably, the mould comprises guide holes for said insert tool, wherein said guide hole is smaller in at least one length direction than said insert tool, such that the guide hole must be stretched in order to locate said insert tool. Suitably, the guide hole is of the order of 0.4 mm smaller in at least one length direction than a corresponding length of said insert tool. Advantageously, requiring the guide hole to stretch to locate the insert tool ensures a fluid-tight fit preventing leakage of the structural compound which can result in undesirable flashing forming on the resultant strap.

Preferably, the method further comprises curing or drying the wet applied structural component.

Preferably, the method further comprises removing excess wet applied structural component.

Preferably, the cage comprises flow channels for fluid flow.

A further aspect of the present invention relates to a wearable device made according to the method described above.

A further aspect of the present invention relates to a method of manufacturing a wearable device comprising a printed circuit board (PCB) on which is mounted electronic components, the method comprising: attaching said PCB to a cage, providing a mould for a strap, the strap comprising a first end, a second end and at least one opening intermediate said first and second ends, inserting said PCB into said mould, arresting the cage such that said PCB and said cage are not in contact with and cannot move with respect to said mould by attaching at least one insert tool to said cage at the location of said opening, wherein said insert tool includes an injection bore; injecting a wet applied structural component into said strap via said injection bore; removing said insert tool; and covering said opening with a plate.

Preferably, the cage comprises a plurality of fixing holes for attaching the cage to the insert tool using a fixing means.

Preferably, at least one of said fixing holes are constructed to allow the insert tool to arrest the cage by releasably attaching to said fixing holes.

Preferably, at least one of said fixing holes is used to affix the plate to the cage.

Preferably, the fixing means is any of a screw, a bolt or a rivet comprising a head with a tool engagement portion.

Preferably, the thickness of the strap is less than 10 millimetres.

Preferably, the wet applied structural component comprises polyurethane.

Preferably, prior to injecting the wet applied structural component, a space of at least 0.5 millimetres is left between the strap and the PCB in all directions.

Preferably, the electronic components include a transmitter for transmitting radio signals.

Preferably, electronic components include at least one of a battery, a light emitting diode, a button for operation of the transmitter for transmitting radio signals.

Preferably, the mould for the strap includes a second opening and said PCB is arrested by at least two insert tools inserted into the first opening and the second opening to engage with said fixing holes.

Preferably, the plate comprises a ceramic material. Advantageously this is radio transparent and conveys luxury.

Preferably, the method further comprises curing or drying the wet applied structural component.

Preferably, the method further comprises removing excess wet applied structural component.

A further aspect relates to a wearable device made using the method described above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Certain terminology is used in the following description for convenience only and is not limiting. The words 'right', 'left', 'lower', 'upper', 'front', 'rear', 'upward', 'down', 'downward', 'above' and 'below' designate directions in the drawings to which reference is made and are with respect to the described component when assembled and mounted (e.g. in situ). The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Through the description and claims of this specification, the terms 'comprise' and 'contain', and variations thereof, are interpreted to mean 'including but not limited to', and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality, as well as, singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract or drawings), or to any novel one, or any novel combination, of the steps of any method or process so disclosed.

Figure 1A:
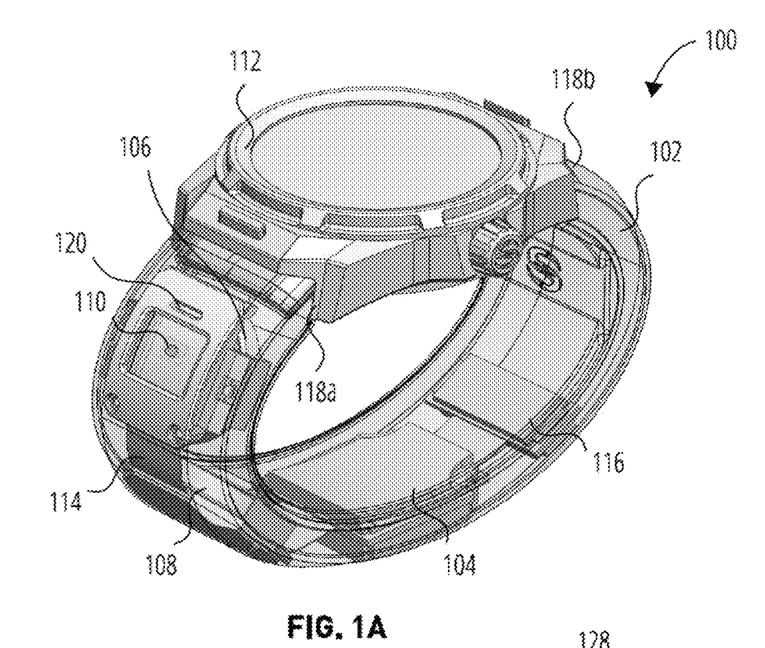
FIG. 1A illustrates a view of a watch with a strap according to an embodiment of the present invention.

FIG. 1A shows the internal components of a strap 102 according to an embodiment of the present invention. The strap 102 is connectable to a watch housing 112 to provide the functionality of a conventional mechanical watch with apparatus for communicating with a remote security system. Although the present invention may have other applications, the invention will be described with particular reference to examples in which the security system is a remote security system of a vehicle, such as a keyless entry or a Keyless Go™ system. The strap may be a strap, or bracelet without a watch or watch housing 112.

The strap 102, includes two ends 118a, 118b, the ends are connected to opposite sides of an optional watch housing 112, which contains a mechanical watch movement. Here mechanical means a watch movement which derives its power from a coiled spring and/or one which derives regulation from an escapement mechanism, rather than, for example, a quartz movement, although other mechanisms may be used instead. The watch housing 112 is made of metal such that it is hard wearing and non-brittle. In some embodiments, the metal may be a precious metal such as gold or platinum. The components of the mechanical watch movement are also made from metal. However, metals, especially precious metals, are generally radio opaque, meaning that communicating with a vehicle via radio antenna within the wearable device housing is not possible, this issue is particularly pronounced when the watch movement is a mechanical watch movement which has all metal parts.

The strap 102 is at least partially flexible and the length variable/settable, such that the wearable device 100 may be worn by users having different sized wrists. In the illustrated embodiment, this is achieved by forming part of each strap from a flexible rubber material. However, the skilled person will understand that other flexible materials could be used in other embodiments.

The strap 102 in the embodiment shown comprises a PCB, including flexible portions 114 and electronic components. In the example shown, the electronic components include first and second batteries 106, 108, the batteries may be coin cells. The electronic components further include a transmitter for transmitting radio signals 104 and a button 110 for activating the electronic components. Each of the electronic components is provided with a cage which has a plurality of uses both during and after manufacture. The transmitter for transmitting radio signals 104 may be a transceiver for receiving and transmitting signals. The transmitter for transmitting radio signals 104 is connected to an antenna 116. Each of the transmitter 104 and the antenna 116 may be configured to either transmit, receive or both transmit and receive signals, such as radio signals. The transmitter and antenna may be configured to receive and transmit signals of different frequencies.

The present invention allows the transmission of signals from the transmitter 104 because the strap 102 is formed from radio transparent materials. For example, the straps may be formed of rubber or polyurethane, and optionally coated with leather or another radio-transparent material.

The transmitter is arranged to transmit radio signals which communicate with a vehicle, allowing a user to passively unlock the vehicle when the watch is within a predetermined range, or actively lock and unlock the vehicle using the button 110. This may be referred to as a keyless entry system. Keyless entry systems typically work by the vehicle intermittently transmitting signals, which are received by a transceiver of the keyless entry system. Upon receipt of the signal from the vehicle, the transceiver produces a signal comprising a code which can be received by the vehicle. If a signal indicating a "correct" code is received by the vehicle, then the doors are automatically unlocked, with no further action from the user being required.

The wearable device 100 is provided with a button 110 attached to the strap 102, which button may be operable to cause a signal to be sent, which signal may cause a vehicle to start if it is sent from within the vehicle. However, it will be understood that the functionality available by pressing the button 110 will depend on the specific vehicle that the wearable device 100 is arranged to unlock and start. In some examples, the button may cause a signal to be sent that operates to unlock the vehicle from a relatively large distance away, in the manner of a conventional remote key.

A particular challenge associated with provision of Keyless Go™ and keyless entry functionality is that a relatively large amount of energy and a relatively high peak current is required to run the array of transceivers for these functions. Further, a large amount of energy will also need to be stored for the keyless entry functionality, because for some keyless entry systems the respective transceiver may need to be transmitting constantly (albeit at a very low power level). The present inventors have recognised that the peak current required by a keyless entry circuit may be in the region of 10 mA for some keyless entry systems. Accordingly, it is necessary to provide a cell that is able to provide this peak current and store an amount of energy that allows the wearable device to function for a required length of time before the battery needs to be replaced. It is also important for the cell to be relatively compact, as package space within the wearable device is limited. A suitable cell/battery may be a CR2032 coin cell.

Placing the batteries under the watch housing 112 may make the watch uncomfortably tall for the user. Therefore, the cells 106, 108 are placed in the strap 102. Placing the cells 106, 108 and the transmitter in the strap 102 ensures that the functionality of the strap and watch is maximised, without degrading the comfort and quality of the watch. Due to the volume required within the strap to house and pot each of the electronic components, it is not feasible to include a clasp, which would disengage the components, making it necessary to allow the strap to flex such that it can be removed from the user without damaging the internal components.

Figure 1B:
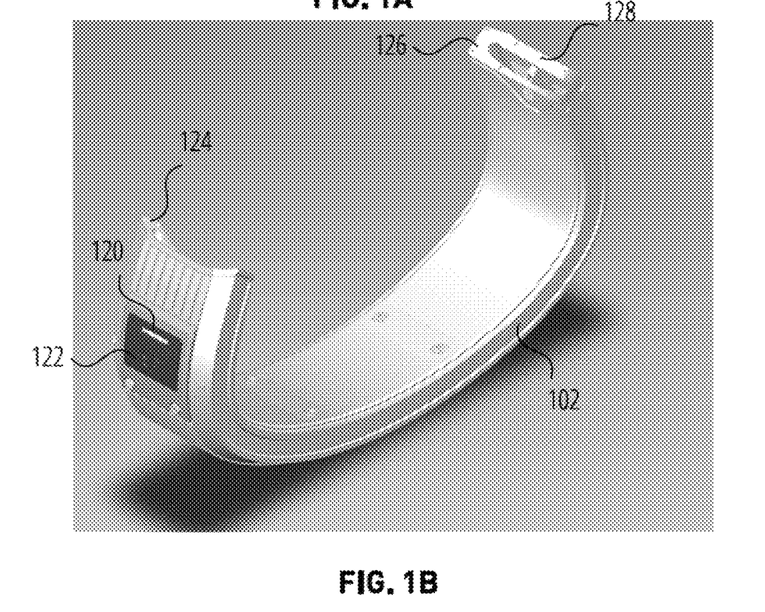
FIG. 1B illustrates a perspective view of a strap made according in accordance with one embodiment.

FIG. 1B shows a perspective view of the strap 102 with the button 122. The outer portion of the button 122 and LED indicator 120 and first and second sockets 124, 126 are visible from the exterior of the strap, but the other components are hidden within the strap. The watch housing which connects to the two ends of the strap 102 is not shown, in some examples, the ends of the strap or the sockets 124, 126, may connect to each other or to a clasp or buckle. In the example shown, the button 122 sits atop one of the battery cells (not shown). The button chassis includes an indicator light, in the form of an LED indicator 120. The battery cell is connected to a second battery which may be attached to a cage (not shown) which is connected to the transmitter for transmitting radio signals 104 (see FIG. 1A). The second battery is connected to the transmitter for transmitting radio signals 104 (see FIG. 1A) via the flexible PCB, and the transmitter is connected to the antenna 116 (see FIG. 1A) via the flexible PCB. In varying examples of the present invention, the electronic components can be arranged in any suitable order.

Figure 2:
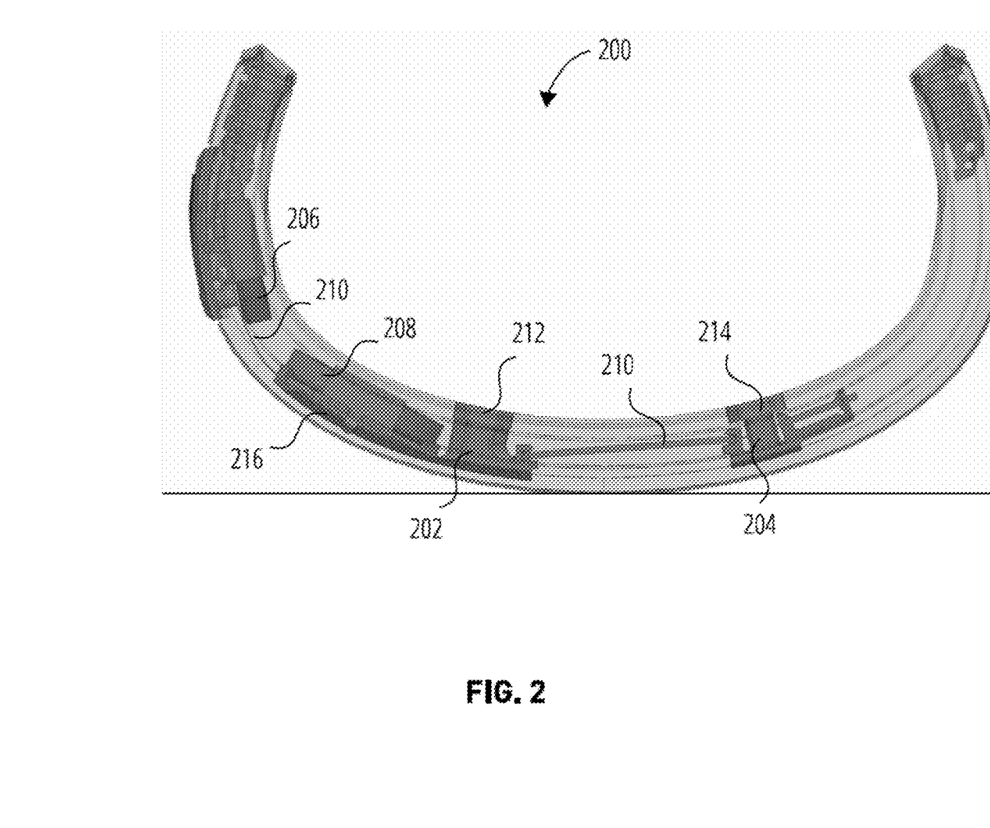
FIG. 2 illustrates a cross section of the strap including a PCB and electronic components.

FIG. 2 shows a cross section of a strap 200 made in accordance with the present invention. The strap 200 includes a first and second cell 206, 208 connected by PCB 210 and first and second electronic components housed within cages 202 and 204. The first cage 202 comprises a main body as well as protruding extension 216. During manufacture, extension 216 supports the second cell 208, holding it in position relative to the mould and the first electronic component. Channels 212 and 214 are formed to accommodate insert tools which are used to arrest the PCB and electronic components in position within the mould. The insert tools include an injection portion to inject the wet applied structural component into the mould as well as at least one attachment bore for applying a fixing means to the cage.

Figure 3:
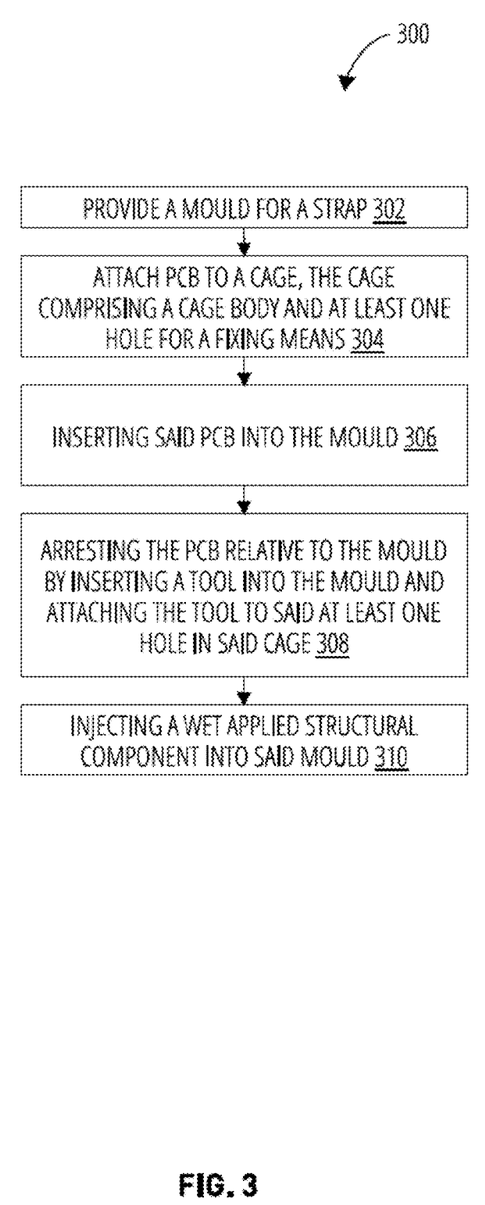
FIG. 3 illustrates a method 300 in accordance with one embodiment.

FIG. 3 shows an outline of a method for forming a watch strap. In step 302 of the method 300, a mould is provided. In step 304, the PCB is attached to a cage comprising a cage body and at least one hole for a fixing means. In some examples the cage consists of several discrete cages, with one cage per electronic component, configured to allow attachment of the components via PCB. In step 306, said PCB is inserted into the mould. In step 308, method 300 arrests the PCB relative to the mould by inserting a tool into the mould and attaching the tool to said at least one hole in said cage. By arresting the cage/PCB with respect to the strap prior to injecting the wet applied structural component, it can be ensured that a consistent distance remains between the strap and the cages. In step 310, method 300 injects a wet applied structural component into the mould. Arresting the cage or cages with respect to the mould may be achieved by the use of external fixings which pass through the strap mould and into corresponding fixation points located on the cages. It will be apparent that the number and location of fixation points will vary depending on the strap and cavity dimensions as well as the size, number, and intended location of the cages/electronic components within the strap. The external fixings may be removed once the wet applied structural component is set/cured or left in place. To ensure that the wet applied structural component fills the void created by the mould, a vacuum may be applied to the mould via vents provided in the body of the mould.

Figure 4:
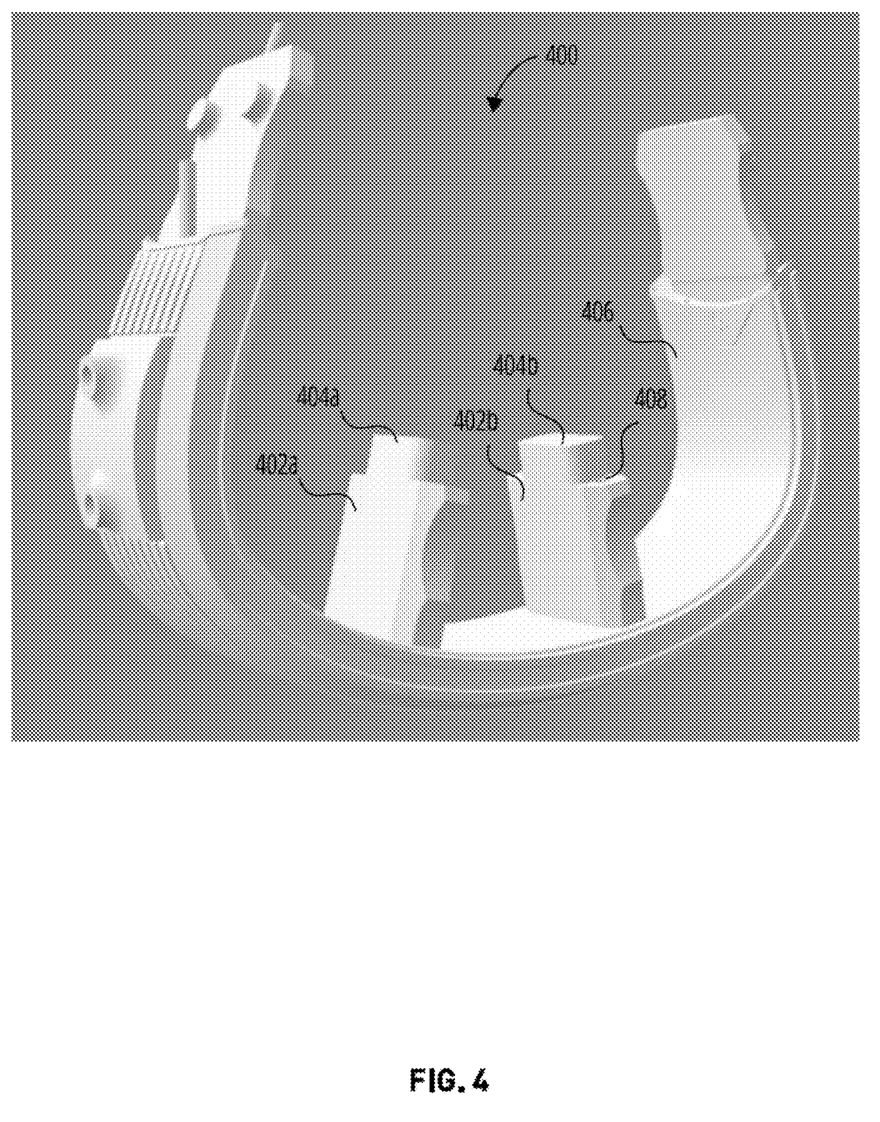
FIG. 4 illustrates an aspect of the subject matter in accordance with one embodiment.

FIG. 4 illustrates the void 400 created within the mould. The mould may be generated by 3D printing a unitary master pattern component, positioning the master within a fabrication box and subsequently filling the fabrication box with liquid silicone rubber. When the silicone rubber has hardened, the silicone is cut into two halves and the master removed, such that when the two halves are placed together a void 400 is left in the form of the required shape for the component. Subsequently, flow channels can be cut into the mould to provide channels through which wet polyurethane can flow. When the two halves of the mould are connected a substantially air tight mould is formed. Vents can be added as required which connect at specific points on the void which provide a fluid connection to a vacuum generator. After injection and curing of the wet applied structural component, the vents will be filled with solid structural component. This leads to blemishes in the resulting strap which may be considered unsightly. Therefore, it is preferable to locate the vents strategically to coincide with additional components such as the button which will cover the blemishes. Alternatively, or additionally, the vents may coincide with an edge of the resulting strap and the edge and resulting blemishes removed with a scalpel or similar implement. The strap sockets 124 and 126 in FIG. 1B show vent holes 128 where the resulting blemishes can be removed in this way. The PCB and cage(s) are positioned within the void and a tool or tools are attached to the cage(s). The tool (or tools) is used to create a small distance on the order of 1 mm between the interior of the mould and the cages and PCB. This is achieved by connecting the tool and cages using bolts which can be finely manipulated to achieve the required distance between the PCB and the mould. The void includes a strap void 406 and at least one tool void 402a/402b. Each tool void has a channel 404a/404b through which the polyurethane flows when injected. The tools further include bolt holes 408 which are used to attach the tool and the cages with a bolt. The channel and bolt holes are combined so as to minimise excess surface blemishes compared with having separate channels and bolt holes.

When the PCB is located within the void liquid polyurethane is injected into the void via the channels 404a, 404b within the insert tools. The flow rate of the polyurethane is aided by the provision of a vacuum which is applied to the void by vents (not shown) in the mould which are in fluid communication with a vacuum generator. This increases the flow rate of the polyurethane and removes the possibility of the flow stopping due to the presence of air pockets within the void. The vents reduce the risk of bubble formation in the strap which have a detrimental impact on appearance, by ensuring that the wet applied structural component is urged into all areas of the mould. The vents subsequently fill with the component forming "strings" which must be removed post-production. The structural component is highly viscous and has a fast cure time of the order of a few minutes, typically three minutes.

Figure 5A:
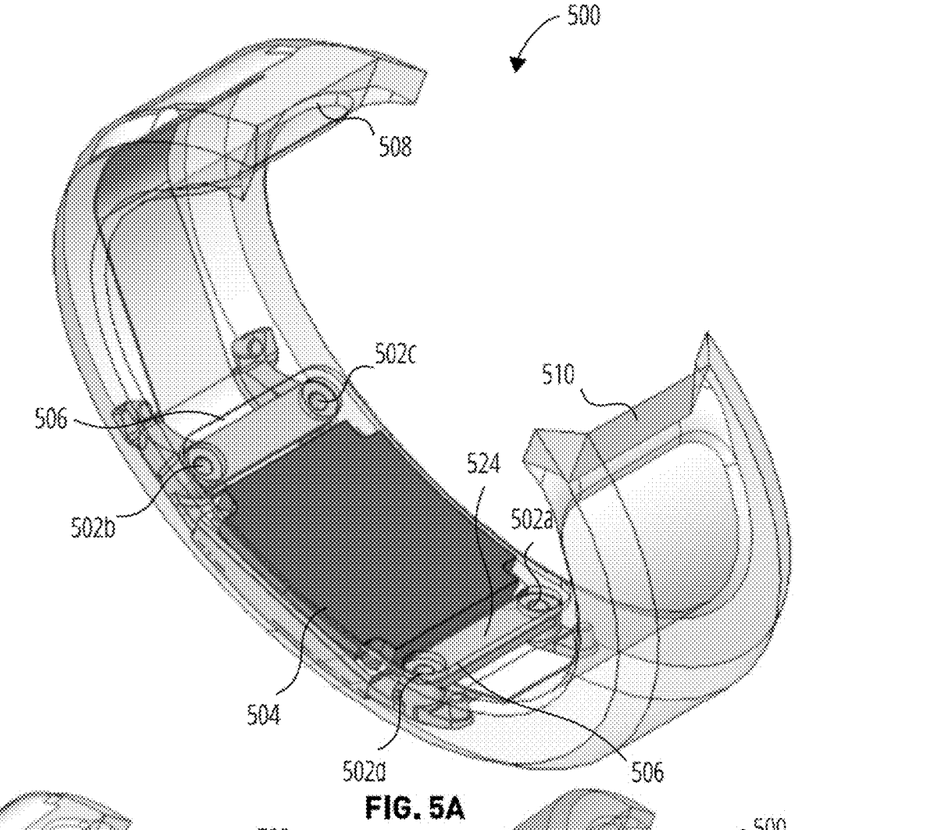
FIG. 5A-5C illustrate a strap in accordance with one embodiment.
Figure 5B:
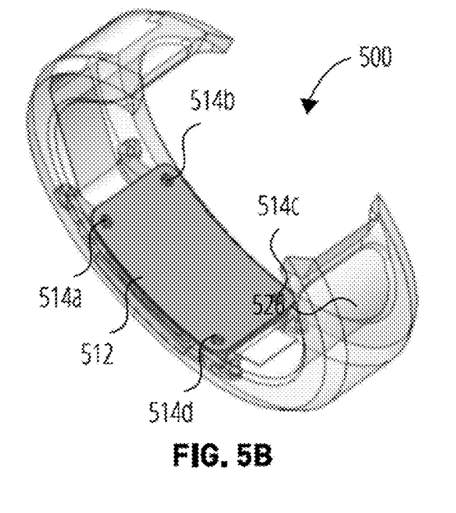
Figure 5C:
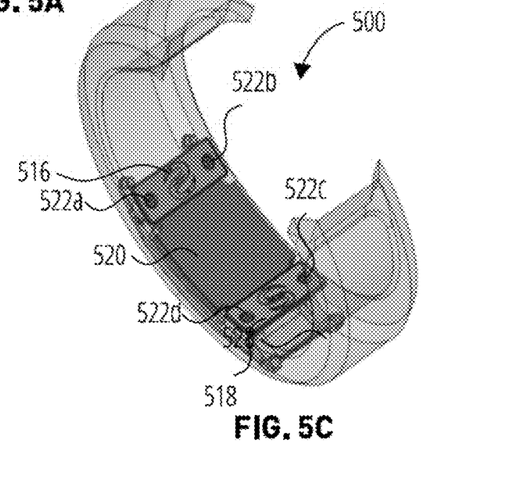

FIG. 5A shows an example strap 500. The strap 500 includes a first end 508, a second end 510 and at least one opening 506 located between the first and second ends. Electronic component 504 is located within the strap and is attached to cage 524. The cage includes several fixing holes (or apertures) 502a-502d. During manufacture, the fixing holes 502a-502d are used in a variety of ways. The fixing holes may be threaded to compliment a thread on the insert tool or a bolt inserted through the insert tool. First, the fixing holes are used to arrest the cage 524 relative to the mould, such that there is a gap between the PCB and the interior of the mould by means of an insert tool which is configured to releasably attach to the holes. After the wet applied structural component has been injected into the mould, and cured (or dried), the fixing holes 502a-502d can be used to affix a plate to the cage as shown in FIGS. 5B and 5C. As the fixing holes are used for both arresting the PCB and to attach a plate the surface finish of the resulting strap is preserved by avoiding an excess of fixation features. The cage may further comprise a web to provide support to the PCB, the web may take the form of a plate of plastic which can bear the weight of a PCB, or section thereof.

FIG. 5B shows the strap 500 further comprising a plate 512 arranged to cover the first and second opening 506. The plate 512 may be constructed to sit flush with the strap 500 such that it does not form a lip on the strap. The plate 512 is provided with guide holes 514a-d which are constructed to line up with fixing holes 502a-d. The plate 512 can therefore be easily attached to the cage within the strap by the use of fixing means, such as screws or rivets.

FIG. 5C shows the strap 500 comprising a first plate 516 and a second plate 518 arranged to cover the second opening 506. Each of the two plates are provided with guide holes 522a-d which are constructed to line up with fixing holes 502a-d shown in FIG. 5A. The plates 516, 518 can therefore be easily attached to the cage within the strap by the use of fixing means, such as screws or rivets.

Figure 6:
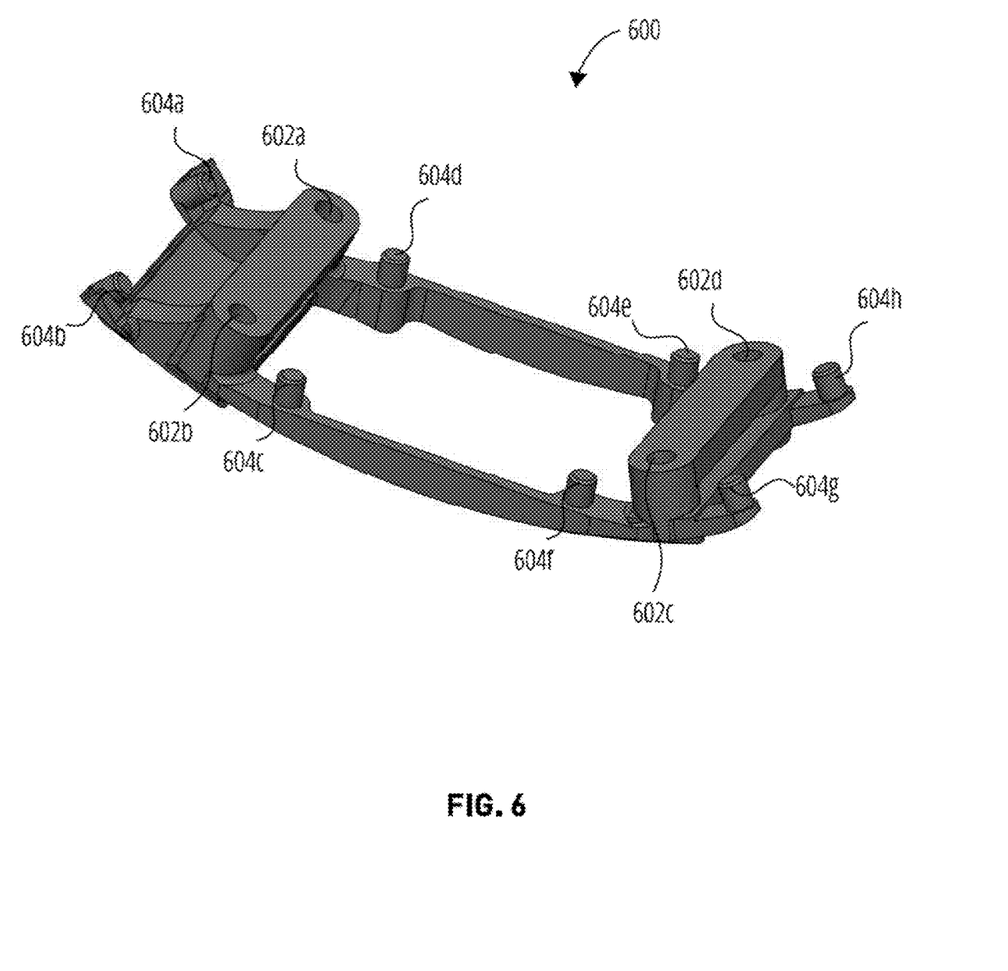
FIG. 6 illustrates an aspect of the subject matter in accordance with one embodiment.

FIG. 6 shows a cage 600 for mounting to the PCB. The cage includes a plurality of fixing holes 602a-d which are used initially to locate the attached PCB within the mould prior to the injection of wet applied structural component. The holes may be tapped such that they can engage with a complimentary tool. Each fixing hole 602a-d attaches to an independently translatable fixing, such that the angle and position of the cage and attached PCB can be finely manipulated prior to injection. The cage further includes a number of mounting features 604a-h which mount complimentary features on said PCB/electronic component. In some examples, the cage is in two or more parts, with fixing holes 602a and 602b and mounting features 604a-d on a first cage and fixing holes 602c, 602d and mounting features 604e-h on a second cage.

Figure 7:
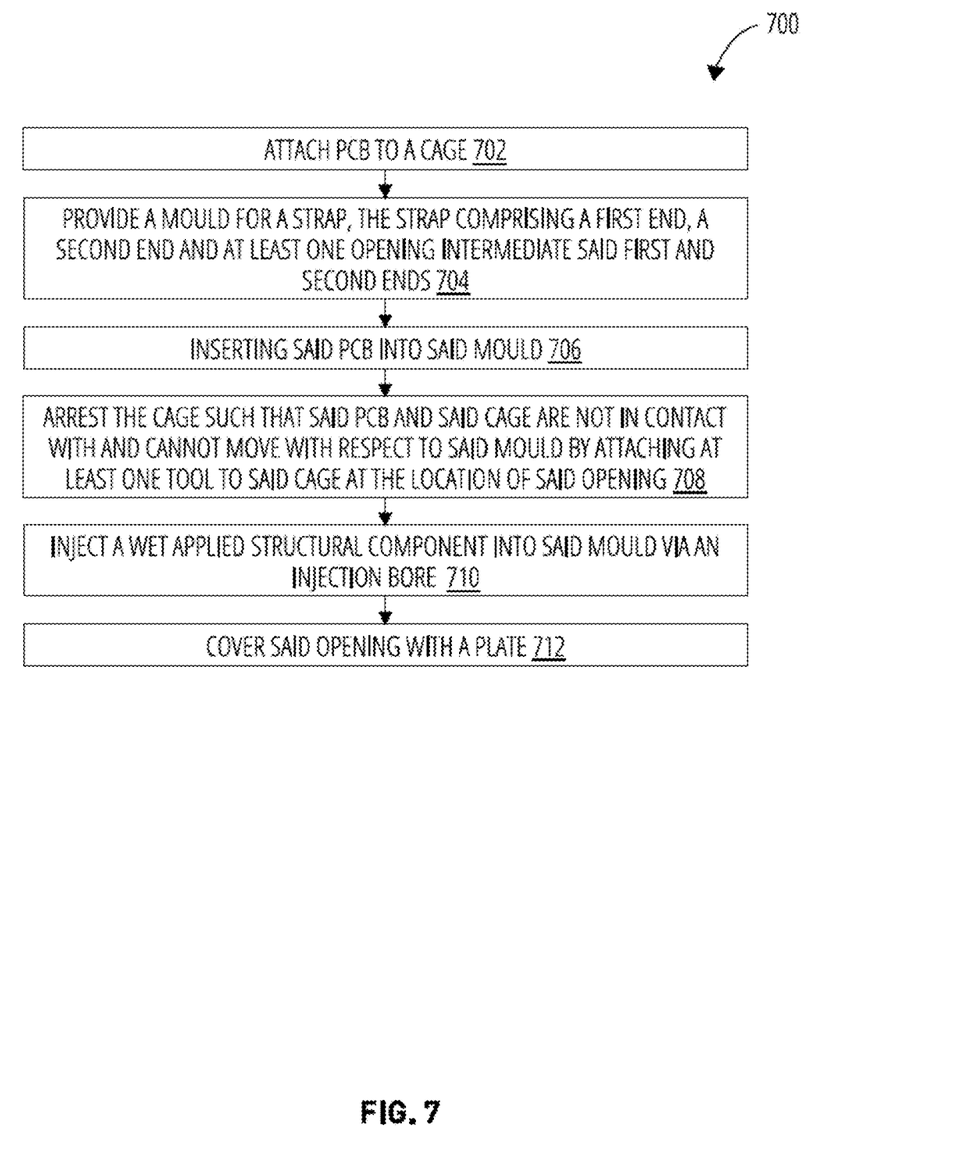
FIG. 7 illustrates a method 700 in accordance with one embodiment.

FIG. 7 shows a flowchart for a method 700 of manufacturing a wearable device. In step 702, the PCB is attached to a cage. In some examples the cage consists of several discrete cages, with one cage per electronic component, the cages configured to allow attachment of the components via PCB. Stated a different way, each cell, transmitter, button and antenna should preferably be attached to a separate cage. In step 704, method 700 provides a mould for a strap, the strap comprising a first end, a second end and at least one opening intermediate said first and second ends. The two ends are the ends which may attach to a watch housing, if used with a watch, or attach to each other by a buckle, if used in a bracelet. In step 706, inserting said PCB into said mould, the electronic components are attached to the cage or cages and rest on the interior of the mould. In step 708, arresting the cage such that said PCB and said cage are not in contact with and cannot move with respect to said mould by attaching at least one tool to said cage at the location of said opening. In step 710, inject a wet applied structural component into said mould via an injection bore. In step 712, the opening is covered by a plate.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible, for example, variations may exist in shape, size, arrangement (i.e. a single unitary components or two separate components), assembly or the like.

The following numbered clauses are not to be confused with the claims:

1. A method of manufacturing a wearable device comprising a printed circuit board (PCB) on which is mounted electronic components, the method comprising:
   providing a mould for a strap;
   attaching said PCB to a cage, the cage comprising a cage body and at least one hole for a fixing means;
   inserting said PCB into the mould;
   arresting the PCB relative to the mould by inserting an insert tool into the mould and attaching the insert tool to said at least one hole in said cage,
   injecting a wet applied structural component into said mould;
   removing said mould.

2. The method of clause 1 wherein the insert tool comprises an injection portion for injecting said wet applied structural component.

3. The method of clause 1 or 2 wherein said insert tool comprises vents for drawing said wet applied structural component under vacuum.

4. The method of any one of clauses 1 to 3 wherein the wet applied structural component comprises polyurethane.

5. The method of any one of clauses 1 to 4 wherein prior to injecting the wet applied structural component, a space of at least 0.5 millimetres is left between the mould and the PCB in all directions.

6. The method of any one of clauses 1 to 5 wherein the cage snap fits to the PCB 7. The method of any one of clauses 1 to 6 wherein the electronic components include at least one of a battery, transmitter for transmitting radio signals, light emitting diode, a button for operation of another electronic component.

8. The method of any one of clauses 1 to 7 wherein the cage comprises a plurality of cages, including a first cage arresting a first electronic component, and a second cage arresting a second electronic component.

9. The method of any one of clauses 1 to 8 wherein the cage further comprises at least one cage extension, wherein said cage body arrests a first electronic component and the cage extension arrests a second electronic component.

10. The method of clause 8 or 9, wherein a first insert tool is attached to the first cage and a second insert tool attached to the second cage.

11. The method of any one of clauses 1 to 10 wherein the mould is formed of silicone.

12. The method of clause 10 wherein the cages are arrested by a tool inserted into said second opening.

13. The method of any one of clauses 1 to 12 wherein the mould comprises at least one vent which connects to a vacuum generator for generating a vacuum which is filled by said wet applied structural component.

14. The method of any one of clauses 1 to 13 wherein the mould comprises at least one guide hole for said insert tool, wherein said guide hole is smaller in at least one length direction than said tool, such that the guide hole must be stretched in order to locate said tool.

15. The method of any one of clauses 1 to 14 wherein the method further comprises curing or drying the wet applied structural component.

16. The method of any one of clauses 1 to 15 wherein the method further comprises removing excess wet applied structural component.

17. The method of any one of clauses 1 to 16 wherein the cage comprises flow channels for fluid flow.

18. A wearable device made using the method of any one of clauses 1 to 17.

The invention claimed is:

1. A method of manufacturing a wearable device comprising a printed circuit board (PCB) on which is mounted electronic components, the method comprising:
   attaching said PCB to a cage,
   providing a mold for a strap, the strap comprising a first end, a second end and at least one opening intermediate said first and second ends,
   inserting said PCB into said mold,
   arresting the cage such that said PCB and said cage are not in contact with and cannot move with respect to said mold by attaching at least one insert tool to said cage at the location of said opening,
   wherein said insert tool includes an injection bore;
   injecting a wet applied structural component into said mold via said injection bore;
   removing said insert tool;
   and covering said opening with a plate.

2. The method of claim 1 wherein the cage comprises a plurality of fixing holes for attaching the cage to the insert tool using a fixing means.

3. The method of claim 2 wherein at least one of said fixing holes are constructed to allow the insert tools to arrest the cage by releasably attaching to said fixing holes.

4. The method of claim 2 wherein at least one of said fixing holes is used to affix the plate to the cage.

5. The method of claim 2 wherein the fixing means is any of a screw, a bolt or a rivet comprising a head with a tool engagement portion.

6. The method of claim 1 wherein the thickness of the strap is less than 20 millimeters.

7. The method of claim 1 wherein the wet applied structural component comprises polyurethane.

8. The method of claim 1 wherein prior to injecting the wet applied structural component, a space of at least 0.5 millimeters is left between the strap and the PCB in all directions.

9. The method of claim 1 wherein the electronic components include a transmitter for transmitting radio signals.

10. The method of claim 1 wherein the electronic components include at least one of a battery, a light emitting diode, a button for operation of the transmitter for transmitting radio signals.

11. The method of claim 1 wherein the mold for the strap includes a second opening and said PCB is arrested by at least two insert tools inserted into the first opening and the second opening to engage with said fixing holes.

12. The method of claim 1 wherein the plate comprises a ceramic material.

13. The method of claim 1 wherein the method further comprises curing or drying the wet applied structural component.

14. The method of claim 1 wherein the method further comprises removing excess wet applied structural component.

* * * * *